(12) United States Patent
Hirata et al.

(10) Patent No.: US 10,887,564 B2
(45) Date of Patent: Jan. 5, 2021

(54) PROJECTION VIDEO DISPLAY APPARATUS AND VIDEO DISPLAY METHOD THEREFOR

(71) Applicants: MAXELL, LTD., Kyoto (JP); HITACHI INDUSTRY & CONTROL SOLUTIONS, LTD., Ibaraki (JP)

(72) Inventors: Koji Hirata, Kyoto (JP); Kazuya Ozawa, Kyoto (JP)

(73) Assignees: MAXELL, LTD., Kyoto (JP); HITACHI INDUSTRY & CONTROL SOLUTIONS, LTD., Ibaraki (JP)

( * ) Notice: Subject to any disclaimer, the term of this patent is extended or adjusted under 35 U.S.C. 154(b) by 0 days.

(21) Appl. No.: 16/470,670

(22) PCT Filed: Dec. 22, 2016

(86) PCT No.: PCT/JP2016/088525
§ 371 (c)(1),
(2) Date: Jun. 18, 2019

(87) PCT Pub. No.: WO2018/116468
PCT Pub. Date: Jun. 28, 2018

(65) Prior Publication Data
US 2019/0335148 A1  Oct. 31, 2019

(51) Int. Cl.
*H04N 9/31* (2006.01)
(52) U.S. Cl.
CPC ......... *H04N 9/3179* (2013.01); *H04N 9/3141* (2013.01)
(58) Field of Classification Search
None
See application file for complete search history.

(56) References Cited

U.S. PATENT DOCUMENTS

| | | | |
|---|---|---|---|
| 10,027,936 | B2 | 7/2018 | Nebashi et al. |
| 2005/0187017 | A1* | 8/2005 | Matsuno .................. A63F 13/90 463/34 |

(Continued)

FOREIGN PATENT DOCUMENTS

| | | |
|---|---|---|
| JP | 2004-184979 A | 7/2004 |
| JP | 2004-222195 A | 8/2004 |

(Continued)

OTHER PUBLICATIONS

International Search Report of PCT/JP2016/88525, dated Mar. 28, 2017.

(Continued)

*Primary Examiner* — Samira Monshi
(74) *Attorney, Agent, or Firm* — Mattingly & Malur, PC

(57) ABSTRACT

A projection video display apparatus and method for solving a problem of deterioration of visibility of video that is projected on a transparent or semi-transparent screen. In a projection video display method for projecting and displaying video light on a rear surface or front surface of a transparent or semi-transparent video projection screen disposed in a space by a projection video display apparatus, video light to be projected and displayed is generated, the generated video light is projected on the rear surface or front surface of the transparent or semi-transparent video projection screen, and at that time, a video display position recognition screen for making an observer of the video recognize a position where the video is projected is projected on the transparent or semi-transparent video projection screen before start of the projection of the video light or simultaneously with the start of the projection of the video light.

17 Claims, 19 Drawing Sheets

(56) References Cited

U.S. PATENT DOCUMENTS

| | | |
|---|---|---|
| 2005/0243078 A1 | 11/2005 | Ozeki et al. |
| 2008/0030882 A1 | 2/2008 | Ichikawa et al. |
| 2009/0002817 A1 | 1/2009 | Harada et al. |
| 2011/0050738 A1 | 3/2011 | Fujioka et al. |
| 2013/0009863 A1 | 1/2013 | Noda |
| 2014/0226040 A1* | 8/2014 | Okada ............... H04N 5/2621 348/239 |
| 2015/0157416 A1* | 6/2015 | Andersson ............ A61B 34/20 606/102 |
| 2017/0075207 A1 | 3/2017 | Tao et al. |
| 2018/0180982 A1* | 6/2018 | Yamaki ............... G03B 21/00 |

FOREIGN PATENT DOCUMENTS

| | | |
|---|---|---|
| JP | 2005-128343 A | 5/2005 |
| JP | 2006-243693 A | 9/2006 |
| JP | 2012-58353 A | 3/2012 |
| JP | 2013-015796 A | 1/2013 |
| JP | 2015-184298 A | 10/2015 |
| JP | 2016-095456 A | 5/2016 |
| WO | 2006/016556 A1 | 2/2006 |
| WO | 2009/107277 A1 | 9/2009 |
| WO | 2015/133105 A1 | 9/2015 |
| WO | 2015/186630 A1 | 12/2015 |

OTHER PUBLICATIONS

Japanese Office Action received in corresponding Japanese Application No. 2018-557498 dated Oct. 27, 2020.

\* cited by examiner

FIG. 1
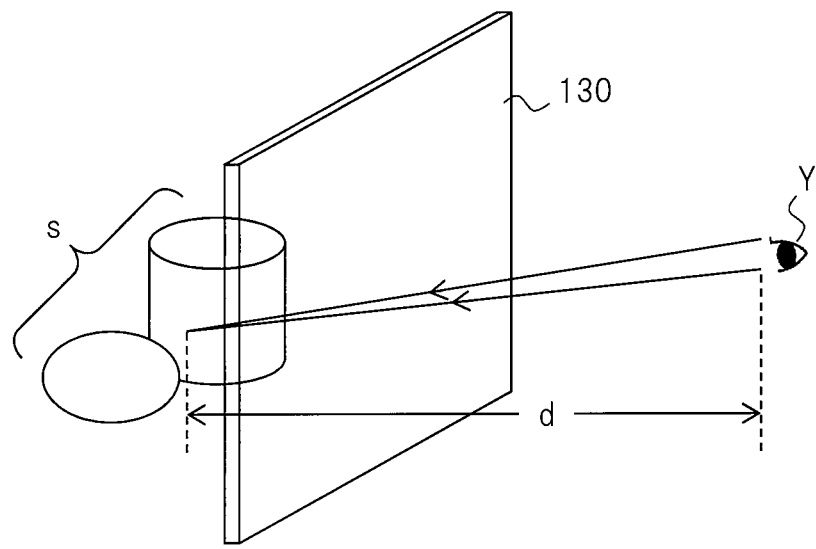
(a)
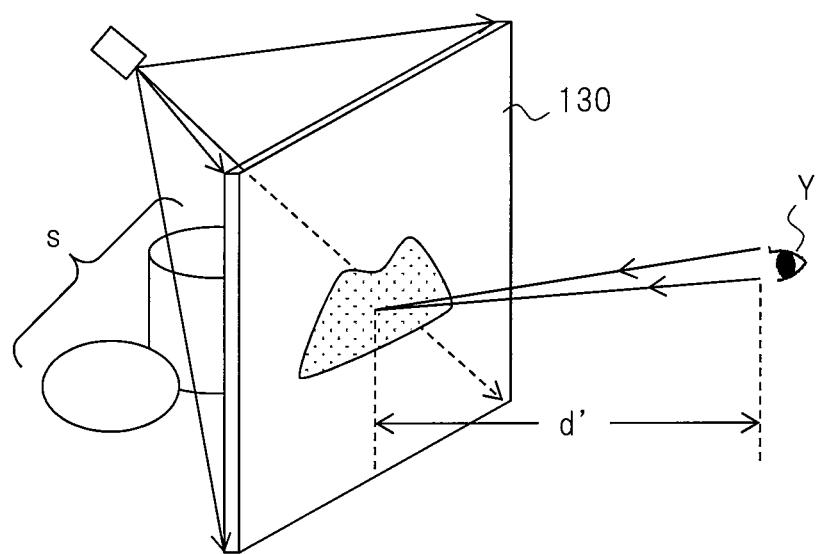
(b)

FIG. 2
(a)
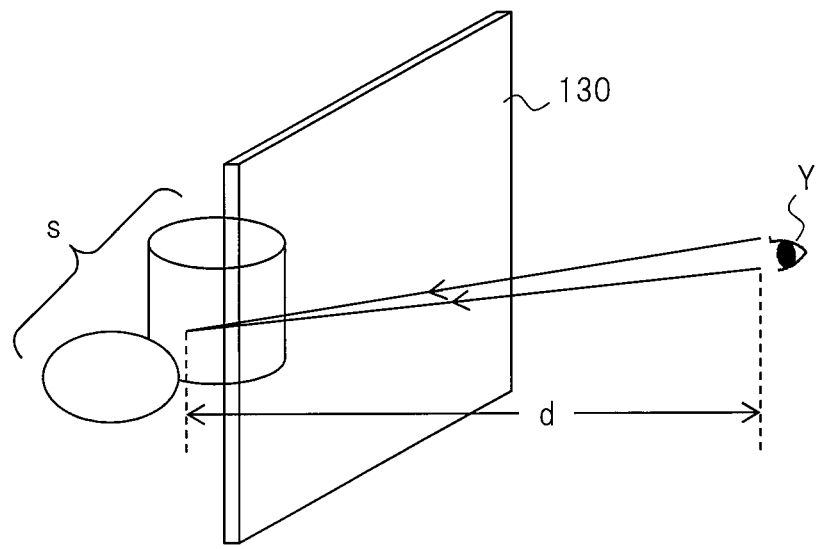
(b)
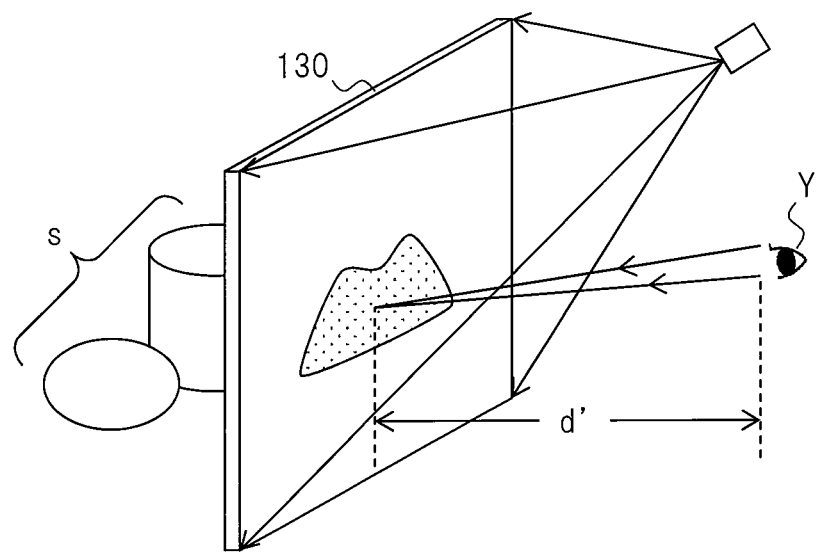

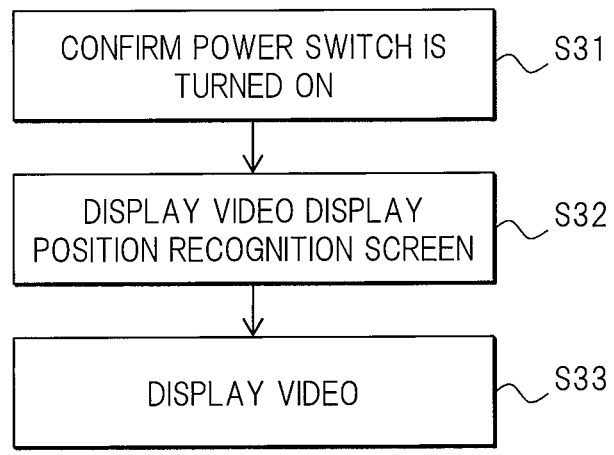
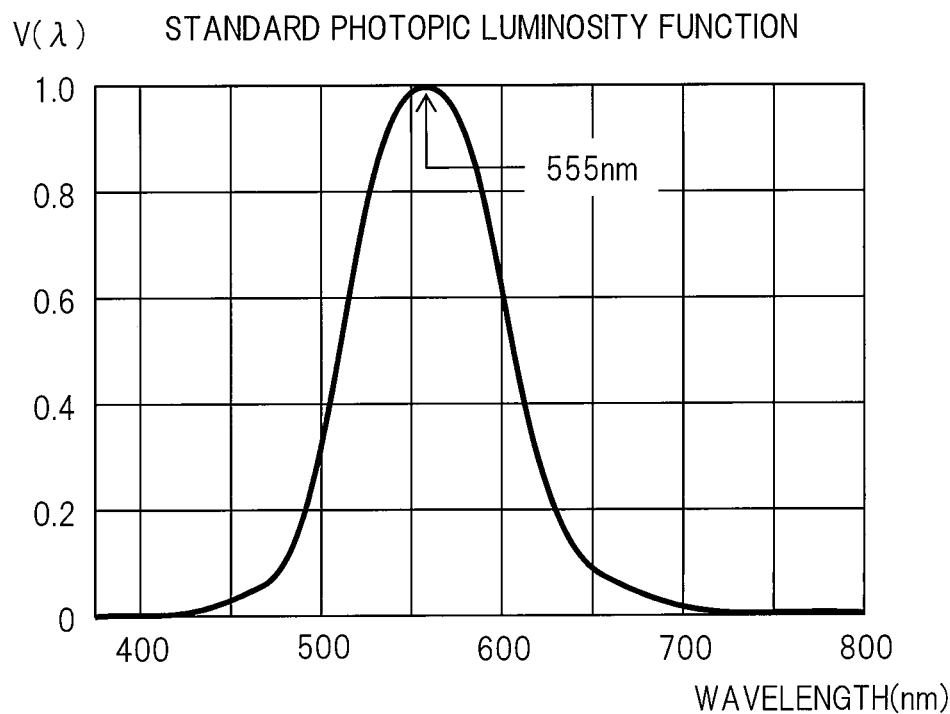
FIG. 4

FIG. 5
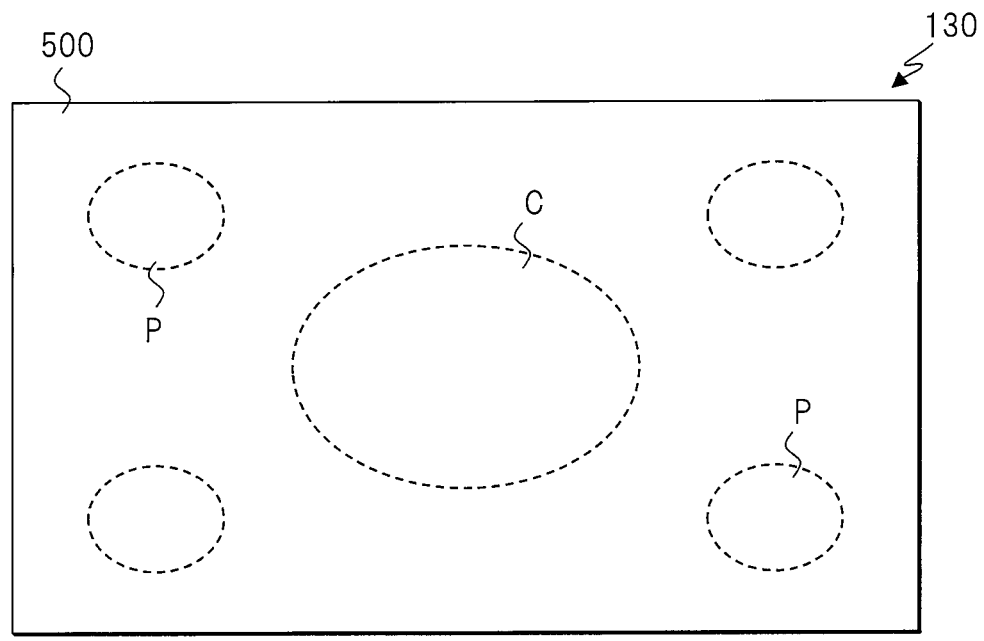
(a)
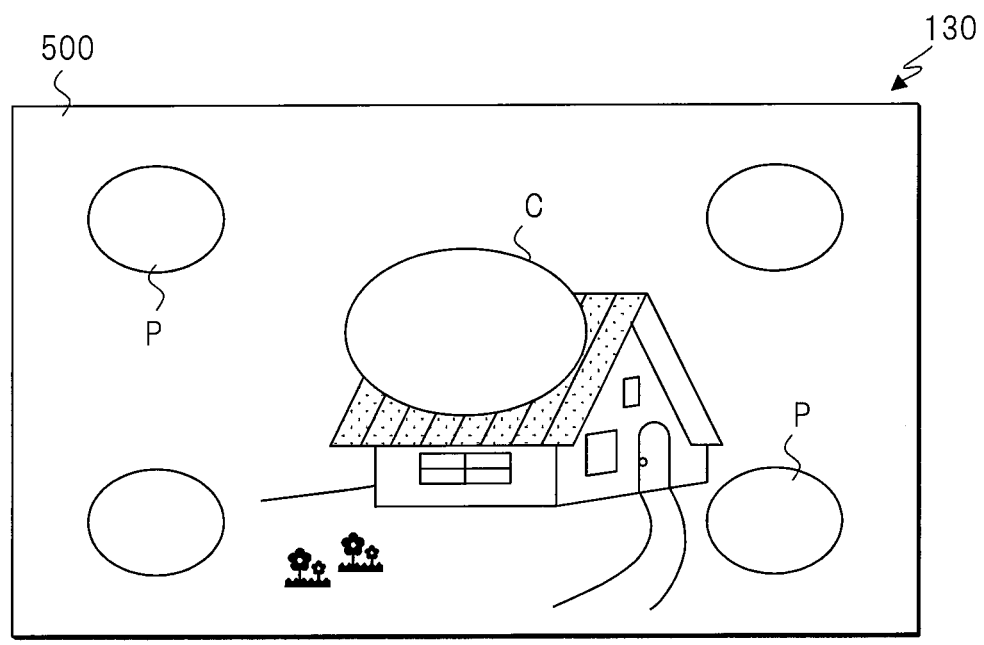
(b)

PROJECTION VIDEO DISPLAY APPARATUS AND VIDEO DISPLAY METHOD THEREFOR

TECHNICAL FIELD

The present invention relates to a projection video display apparatus which displays video by projecting the video on a transparent projection screen from a rear surface side or a front surface side and a video display method therefor.

BACKGROUND ART

A projection video display apparatus can be manufactured at relatively low cost as a large-size and flat video display apparatus and is light-weight and excellent in portability, and thus it is widely used as a video display apparatus in an educational facility, a conference room or the like by taking advantage of its characteristics in addition to the use as a television receiver.

A screen on which the enlarged video is projected from the projection video display apparatus is not limited to the general opaque screen used conventionally, and various suggestions including a screen in which light transmittance is changed in consideration of installation place and a semi-transparent reflection screen have been made as shown in the following Patent Document 1 and Patent Document 2. Further, in recent years, as the video display apparatus that uses a structure such as a wall or a window of a building as a screen, the following Patent Document 3 and Patent Document 4 suggest a video display system in which the video is projected on a transparent member and further suggest a video display transparent member therefor.

RELATED ART DOCUMENTS

Patent Documents

Patent Document 1: Japanese Patent Application Laid-Open Publication No. 2005-128343
Patent Document 2: Japanese Patent Application Laid-Open Publication No. 2006-243693
Patent Document 3: Japanese Patent Application Laid-Open Publication No. 2016-95456
Patent Document 4: WO 2015-186630

SUMMARY OF THE INVENTION

Problems to be Solved by the Invention

As described above, in the conventional technology, the projection video display apparatus capable of using a semi-transparent or transparent screen having transmission characteristics through which background can be seen when no video is projected and further a window or the like which is a part of a structure of a building as a screen instead of the conventional opaque screen has been suggested. Accordingly, since the background can be seen when no video is displayed, the degree of freedom of the place on which the video is projected can be greatly improved. However, as described below, the problem including the visibility of the video at the time of starting the projection of the video from the video display apparatus is not taken into consideration at all. Therefore, various improvements necessary for the video display apparatus capable of projecting the video on the transparent screen have been required.

Thus, the present invention is made for solving the above-described problem in the conventional technology, in particular, the deterioration of visibility of the projected video in the video display apparatus which projects the video on a transparent or semi-transparent screen having transmission characteristics through which background can be seen when no video is projected. Therefore, an object of the present invention is to provide a projection video display apparatus capable of improving the degree of freedom of the place on which the video is projected and improving the visibility of the projected video and a video display method therefor.

Means for Solving the Problems

In order to achieve the object described above, for example, the present invention suggests a projection video display apparatus for projecting and displaying video light on a rear surface or front surface of a transparent or semi-transparent video projection screen disposed in a space, the projection video display apparatus comprising: at least a unit configured to generate the video light to be projected and displayed; and an optical unit configured to project the generated video light to the rear surface or front surface of the transparent or semi-transparent projection screen, wherein the video light generating unit includes a unit for generating a video display position recognition screen for making an observer of the video recognize a position where the video is projected.

Also, in order to achieve the object described above, the present invention suggests a video display method for projecting and displaying video light on a rear surface or front surface of a transparent or semi-transparent video projection screen disposed in a space by a projection video display apparatus, wherein, in a unit configured to generate video light to be projected and displayed and project the generated video light on the rear surface or front surface of the transparent or semi-transparent video projection screen, when the video light is projected on the transparent or semi-transparent video projection screen, a video display position recognition screen for making an observer of the video recognize a position where the video is projected is projected on the transparent or semi-transparent video projection screen before start of the projection of the video light or simultaneously with the start of the projection of the video light.

Effects of the Invention

According to the present invention described above, in particular, a video display apparatus which can improve the degree of freedom of the place on which the video is projected and projects video on a transparent or semi-transparent screen having transmission characteristics through which background can be seen when no video is displayed and a method therefor are provided, and a remarkable effect of being able to solve the problem when the video is projected and displayed on the transparent or semi-transparent screen and improve the visibility thereof is exerted.

BRIEF DESCRIPTIONS OF THE DRAWINGS

FIG. 1(a) and FIG. 1(b) are explanatory diagrams showing display of video in a rear projection board apparatus (rear projection video display apparatus) for describing principle of the present invention;

FIG. 2(a) and FIG. 2(b) are explanatory diagrams showing display of video in a front projection board apparatus (front projection video display apparatus) for describing principle of the present invention;

FIG. 3 is a diagram showing an example of a video display method in the rear projection video display apparatus according to an embodiment of the present invention;

FIG. 4 is a diagram including a graph of standard photopic luminosity function indicating colored light having a high wavelength used as a video display position recognition screen;

Figure 6:
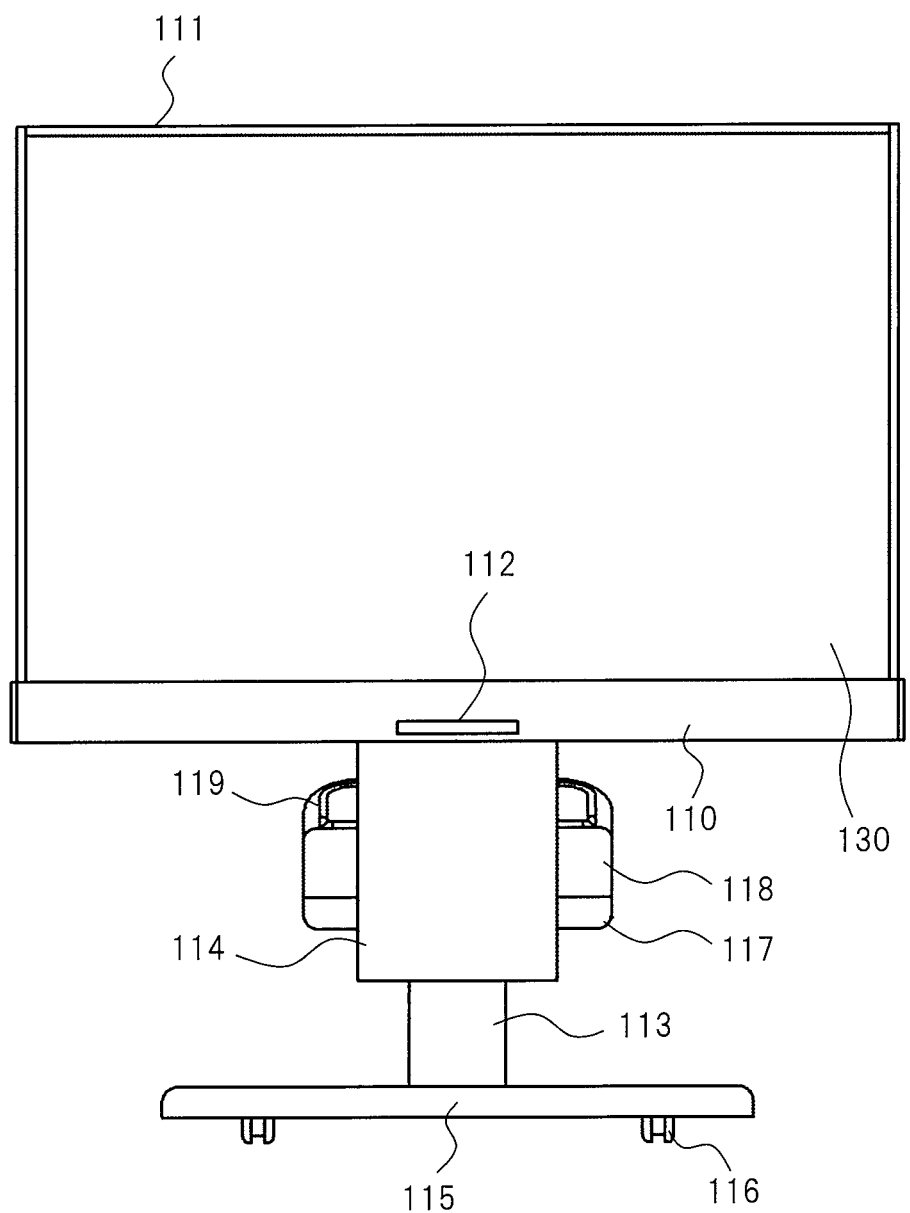
Figure 7:
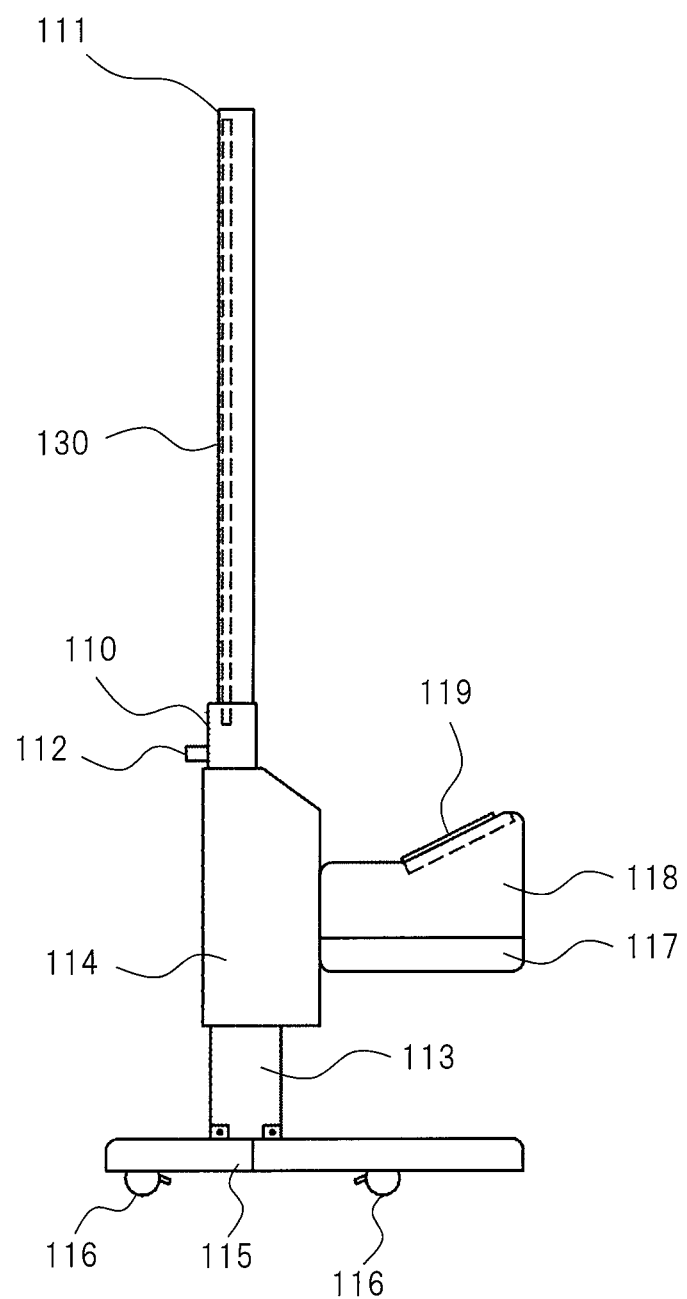
Figure 8:
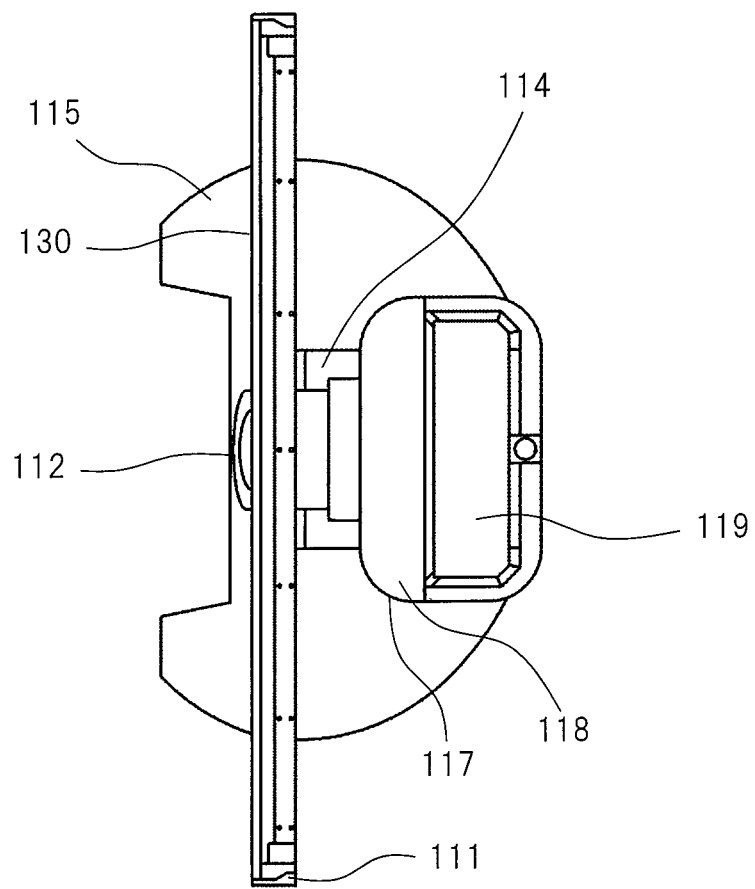
Figure 9:
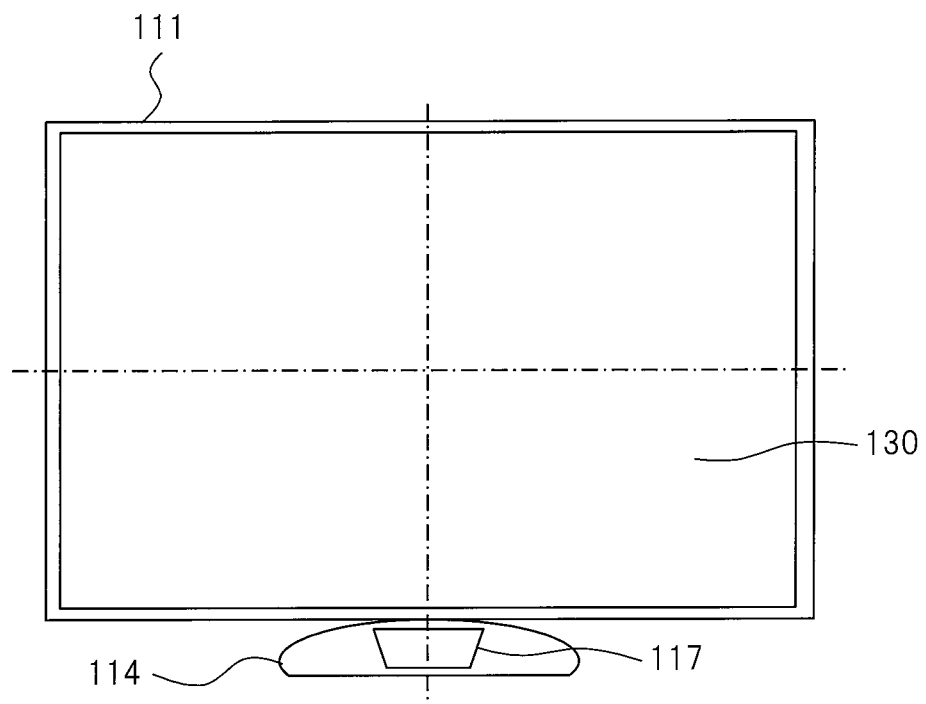
Figure 10:
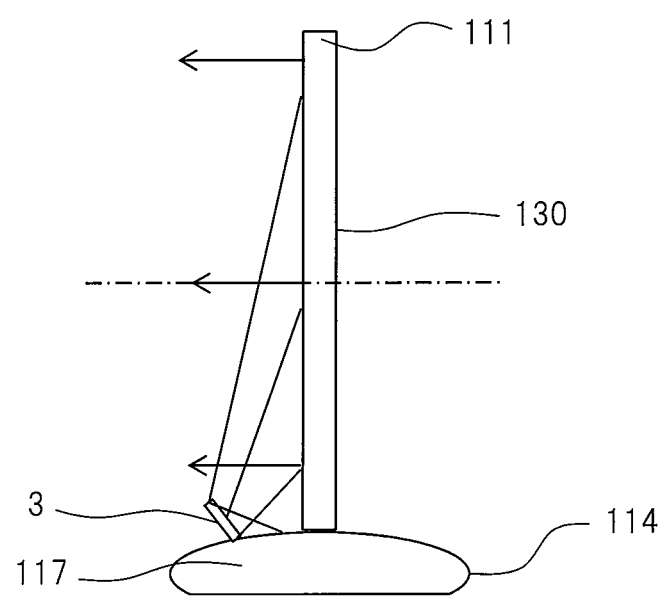
Figure 11:
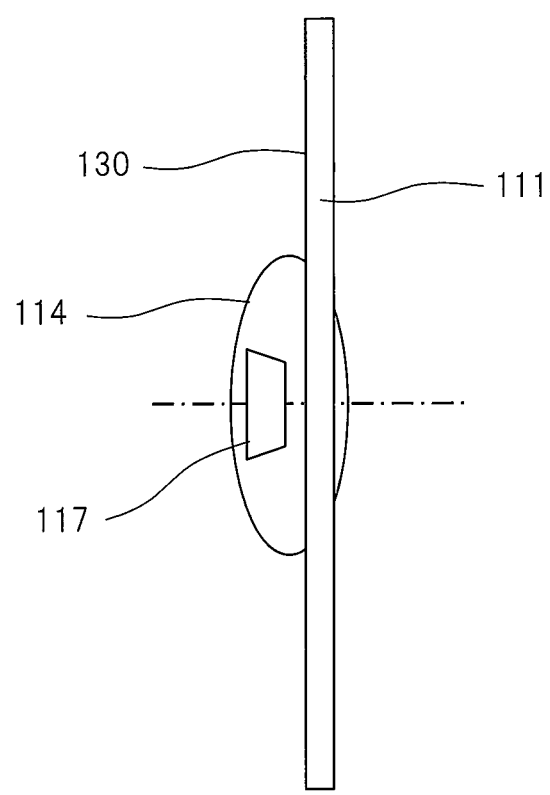
Figure 12:
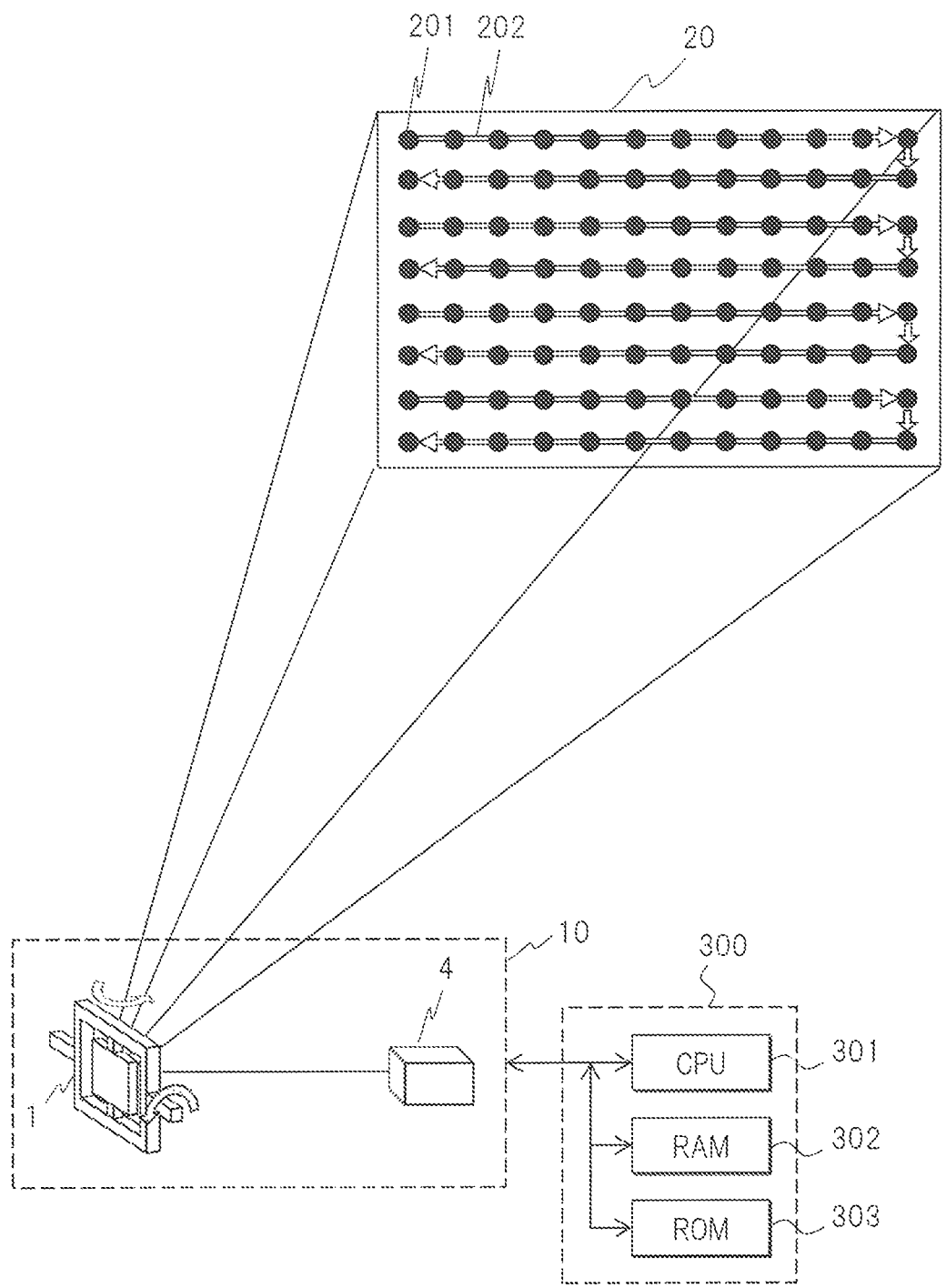
Figure 13:
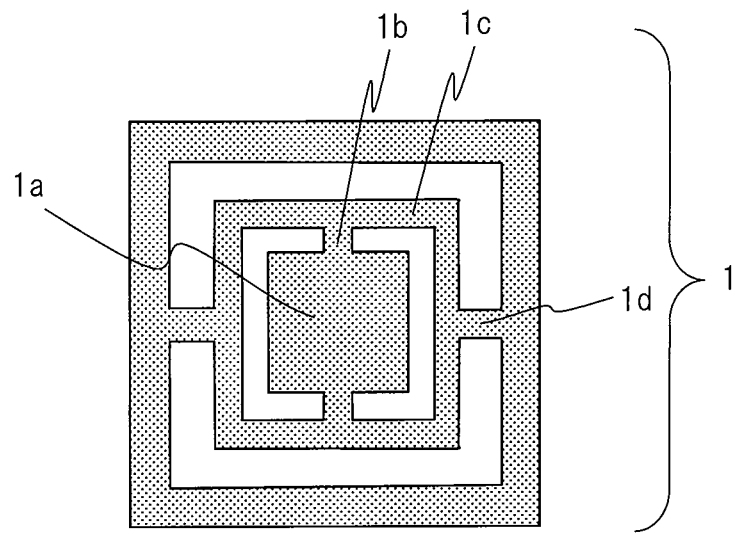
Figure 14:
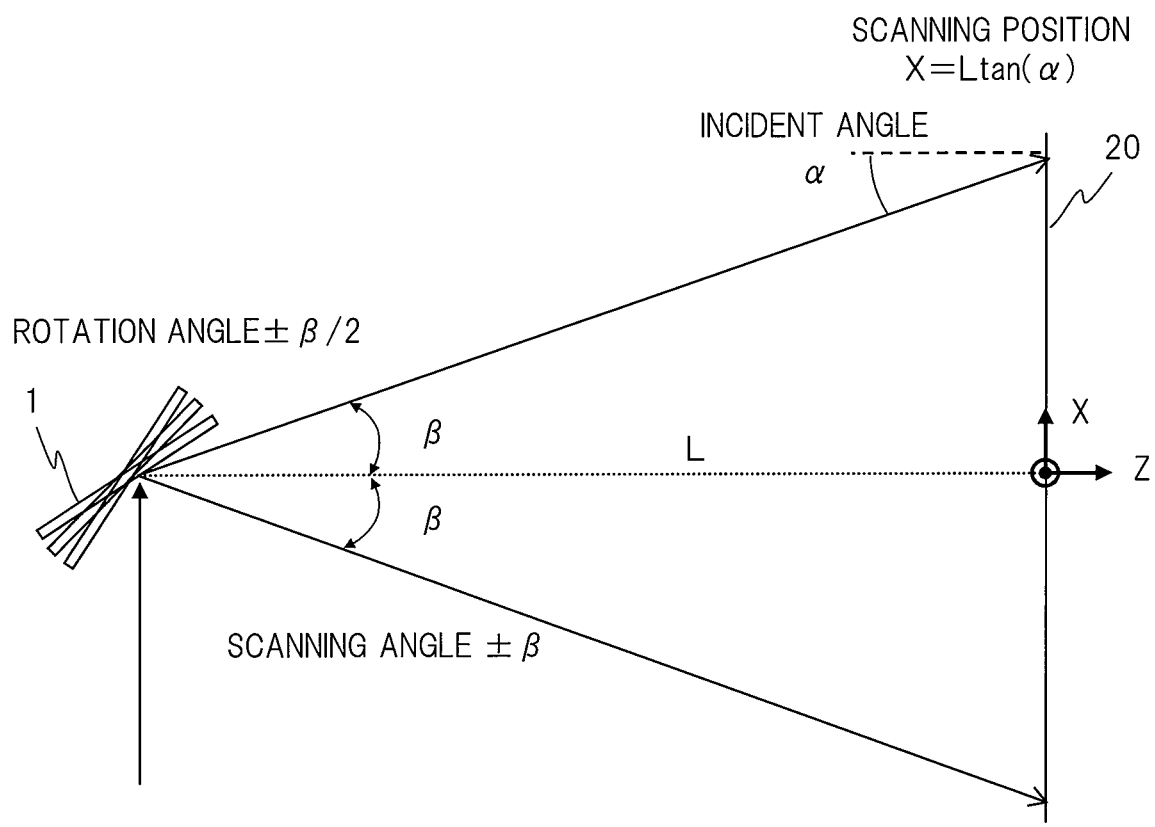
Figure 15:
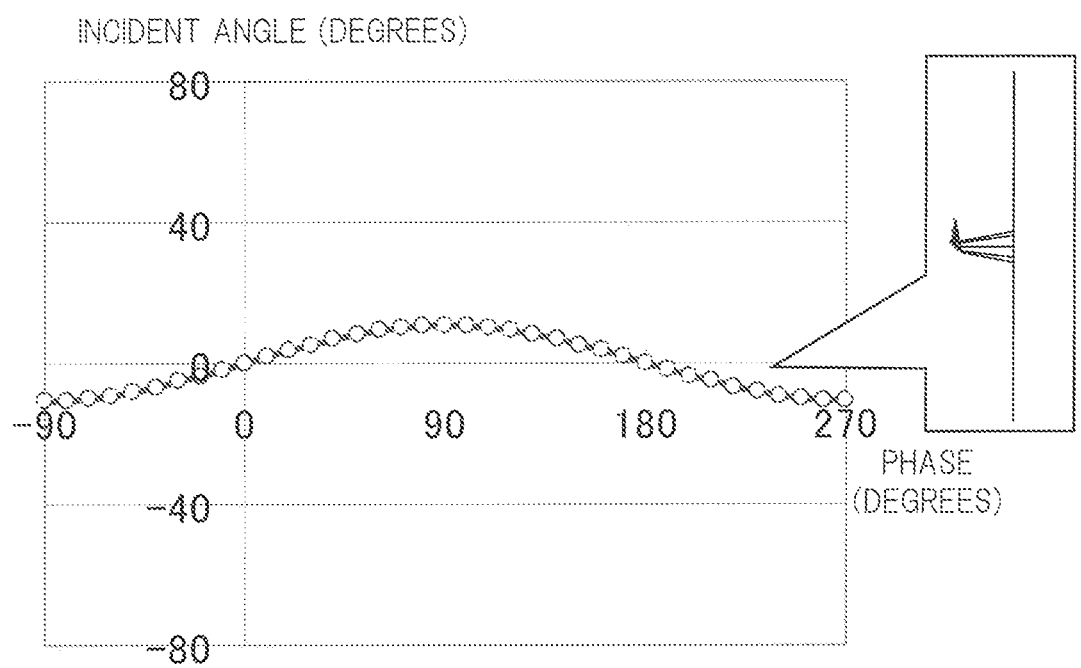
Figure 16:
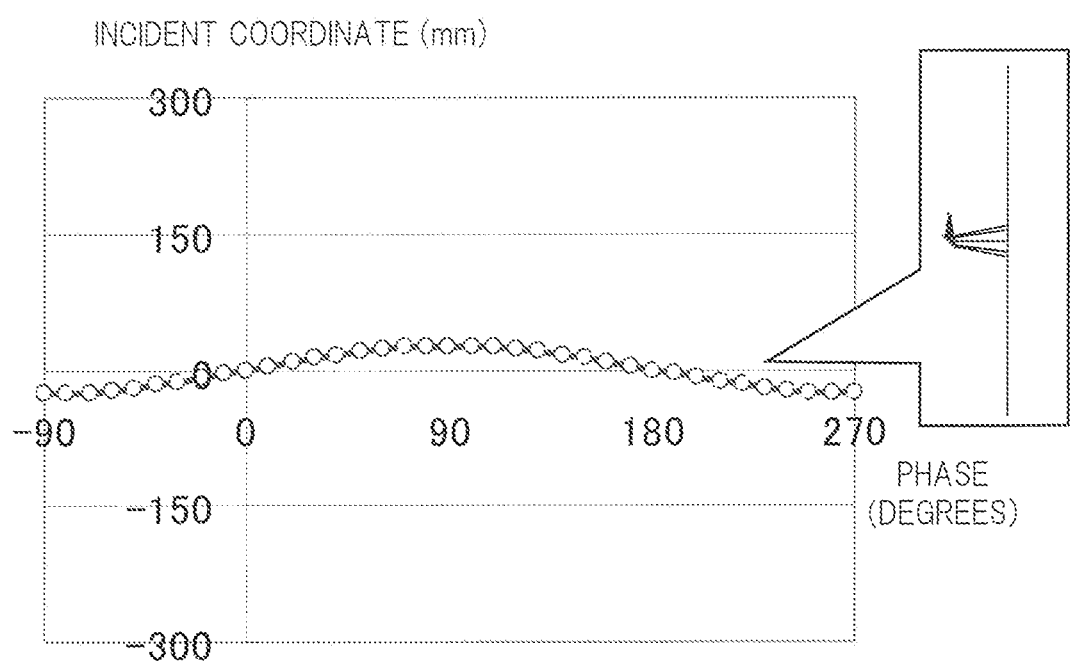
Figure 17:
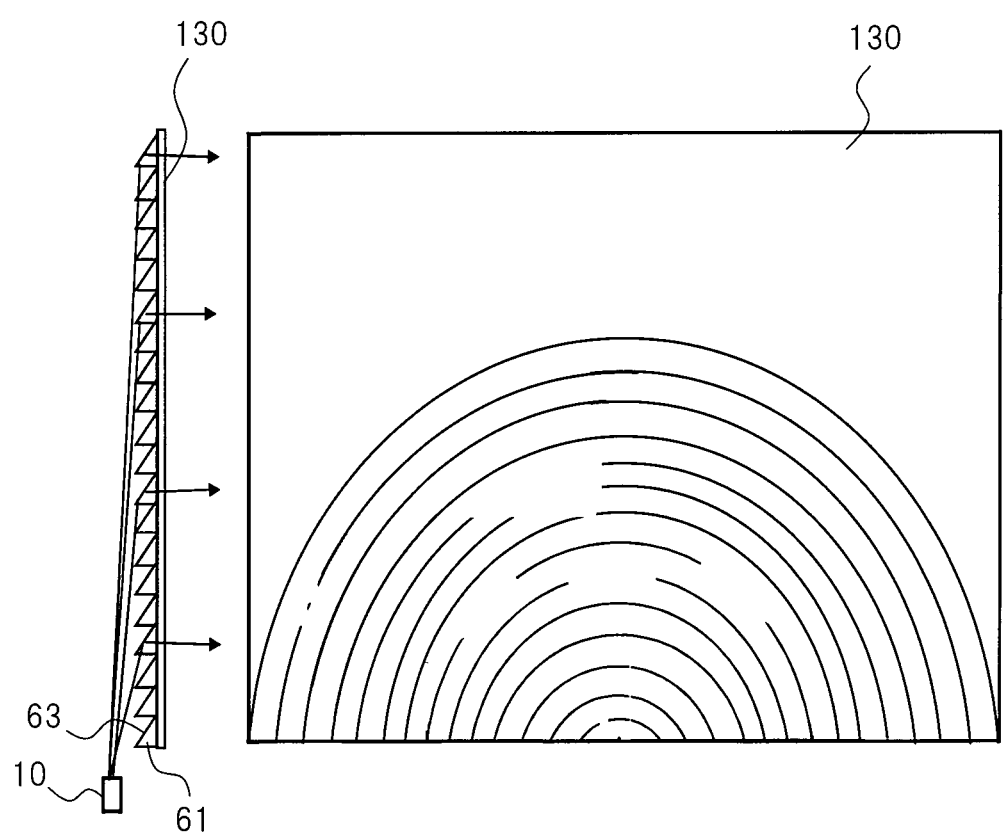
Figure 18:
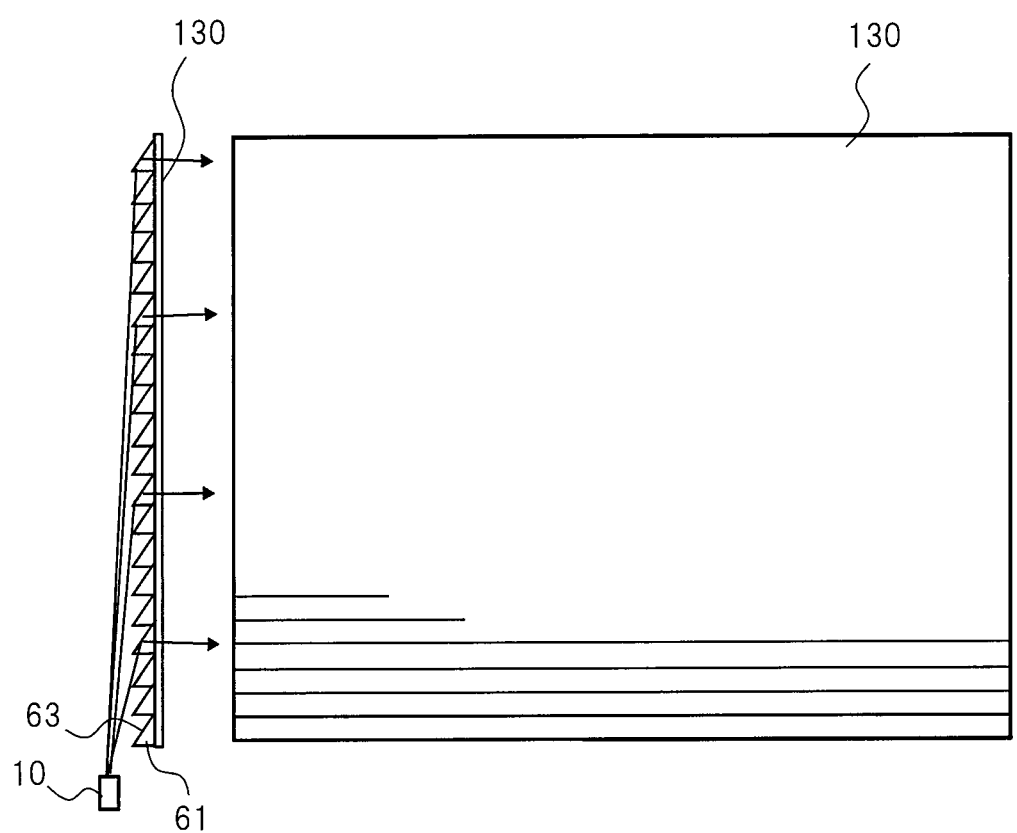
Figure 20:
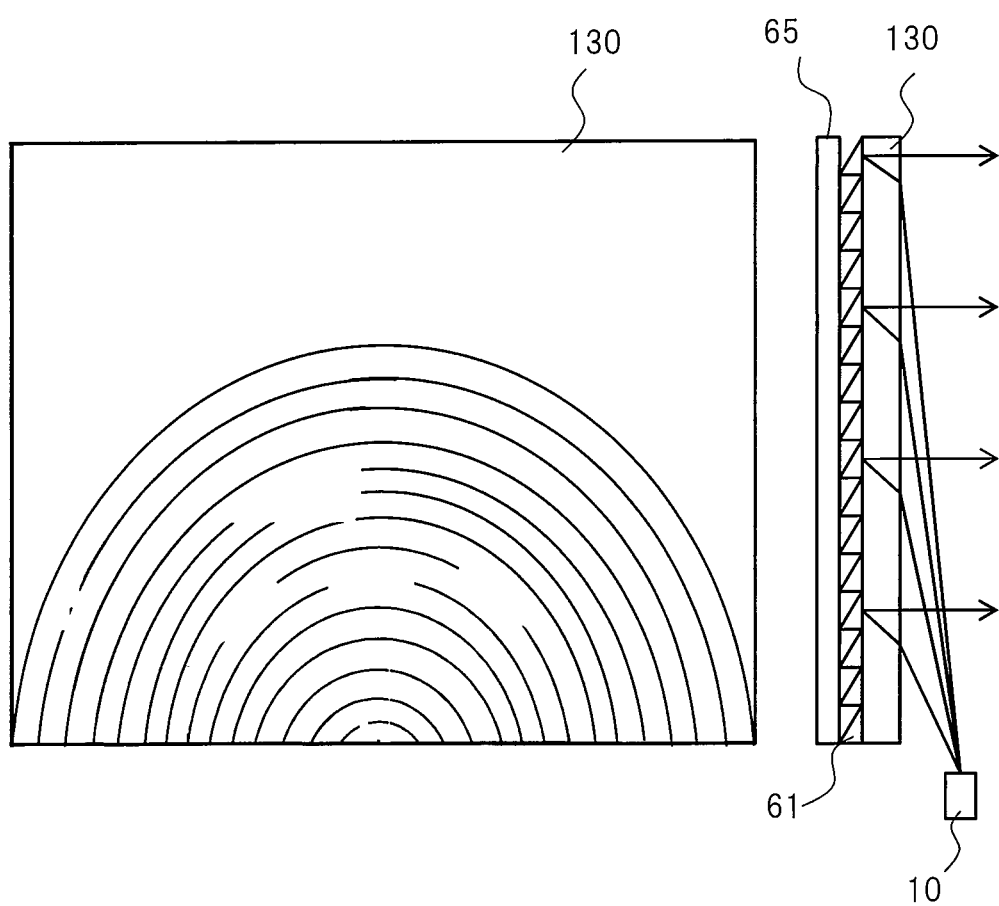
Figure 21:
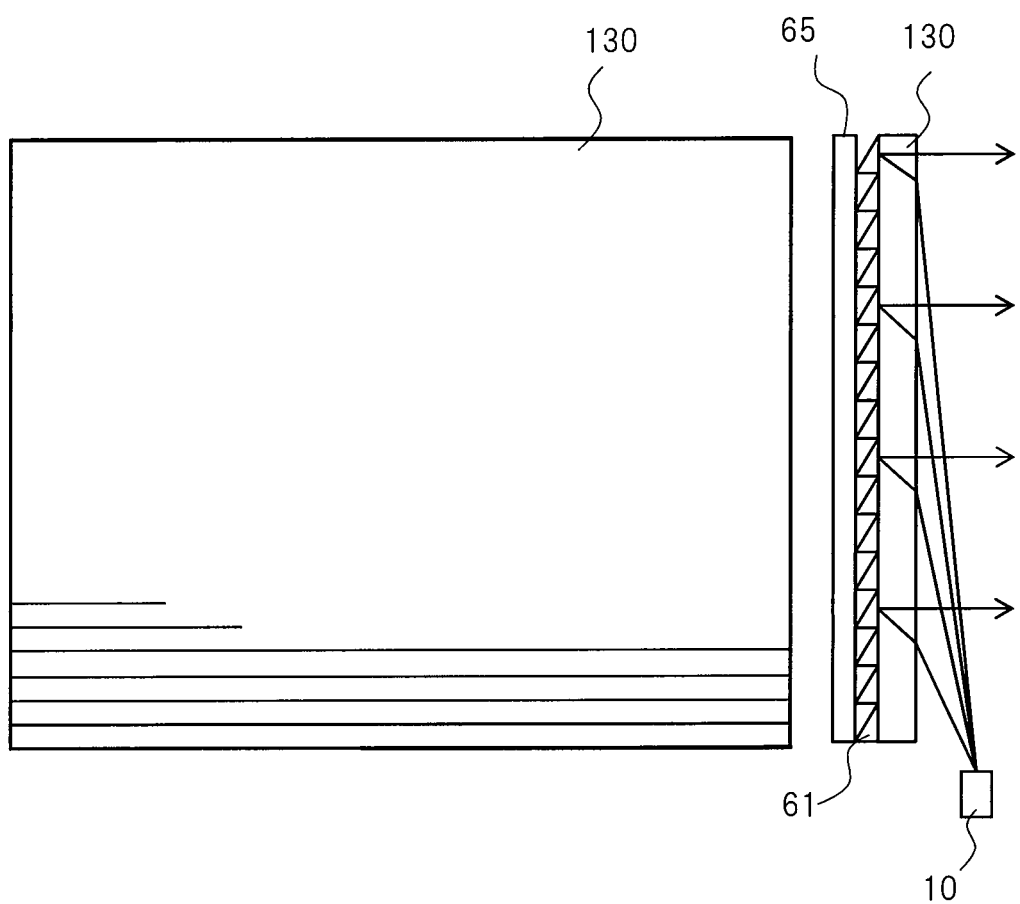
Figure 22:
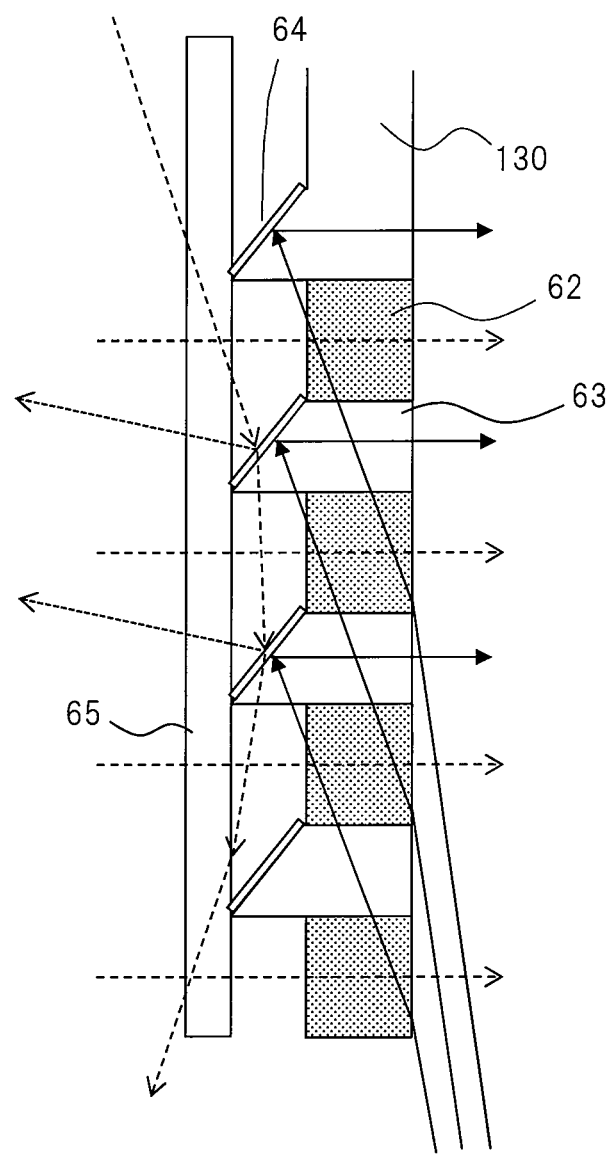
Figure 23:
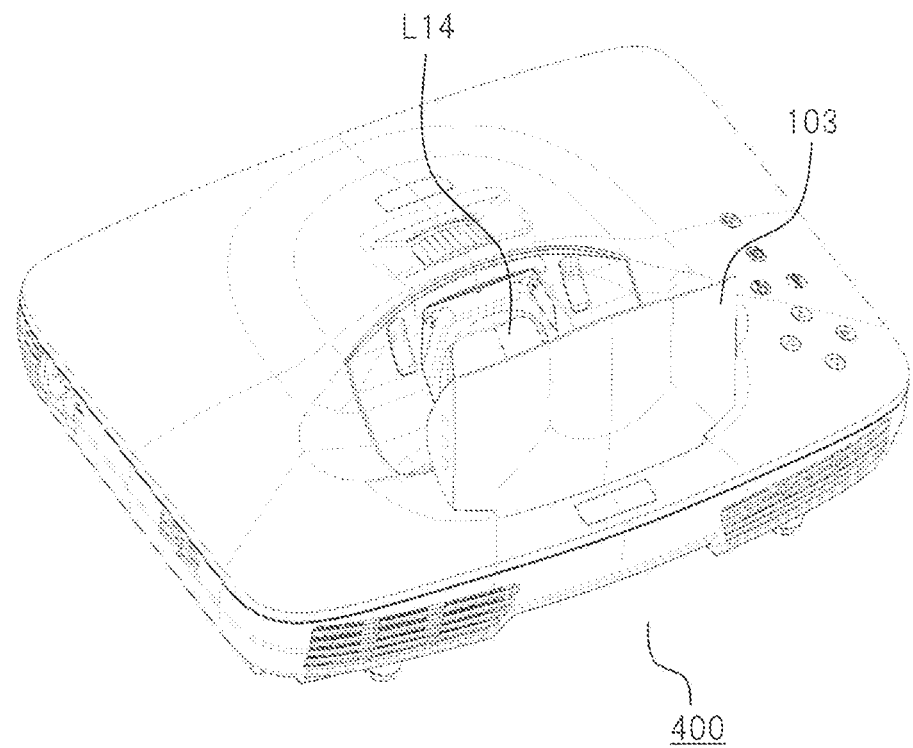
Figure 24:
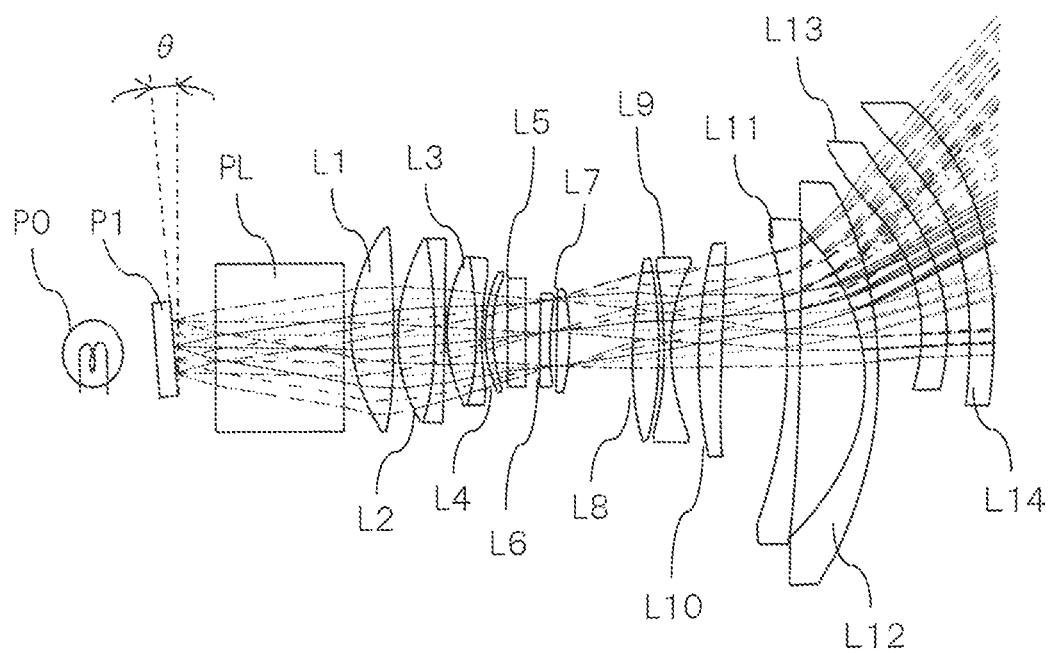

FIG. 5(a) and FIG. 5(b) are diagrams showing an example of the video display position recognition screen;

FIG. 6 is a front view showing an overall structure of the rear projection board apparatus (rear projection video display apparatus) according to the embodiment;

FIG. 7 is a side view showing the overall structure of the rear projection board apparatus (rear projection video display apparatus) according to the embodiment of the present invention;

FIG. 8 is a top view showing the overall structure of the rear projection board apparatus (rear projection video display apparatus) according to the embodiment of the present invention;

FIG. 9 is a front view showing an overall structure of a small-sized front projection board apparatus (front projection video display apparatus) according to another embodiment;

FIG. 10 is a side view showing the overall structure of the small-sized front projection board apparatus (front projection video display apparatus);

FIG. 11 is a top view showing the overall structure of the small-sized front projection board apparatus (front projection video display apparatus);

FIG. 12 is a diagram showing the principle of optical scanning video projection apparatus used for the rear or front projection board apparatus described above;

FIG. 13 is a diagram showing an example of a structure of an optical scanning unit constituting the optical scanning video projection apparatus;

FIG. 14 is a diagram showing an example of an operation (change of a swing angle by a phase of optical scanning unit) of the optical scanning unit constituting the optical scanning video projection apparatus;

FIG. 15 is a diagram showing a relationship between a phase and a swing angle during a general resonant operation of the optical scanning unit;

FIG. 16 is a diagram showing a relationship between a phase and a scanning coordinate during a general resonant operation of the optical scanning unit;

FIG. 17 is a diagram showing a specific configuration (circular Fresnel lens) of a screen in the rear projection board apparatus;

FIG. 18 is a diagram showing a specific configuration (linear Fresnel lens) of the screen in the rear projection board apparatus;

FIG. 19(a) and FIG. 19(b) are partially enlarged cross-sectional views each showing a configuration of the screen in detail;

FIG. 20 is a diagram showing a specific configuration (circular Fresnel lens) of a screen in the front projection board apparatus;

FIG. 21 is a diagram showing a specific configuration (linear Fresnel lens) of the screen in the front projection board apparatus;

FIG. 22 is a partially enlarged cross-sectional view showing a configuration of the screen in detail;

FIG. 23 is a perspective view showing an example of a projection video display apparatus according to another embodiment; and FIG. 24 is a diagram showing an example of an internal configuration of the projection video display apparatus according to the embodiment.

DETAILED DESCRIPTION OF PREFERRED EMBODIMENTS

Hereinafter, embodiments of the present invention will be described in detail with reference to the accompanying drawings. Note that components having the same function are denoted by the same reference characters throughout the drawings below, and the repetitive description thereof will be omitted.

First, FIG. 1 shows states before and after a video is projected on a transparent or semi-transparent projection screen 130 by a so-called rear projection board apparatus (that is, rear projection video display apparatus) according to an embodiment of the present invention. Note that, in this figure, an object S such as furniture or property is disposed behind the projection screen 130 (opposite side to viewing point Y of observer).

FIG. 1(a) shows the state before a video is projected. As can be seen from the figure, the object S disposed on the opposite side enters the field of vision of an eye Y of an observer through the transparent or semi-transparent projection screen 130. Therefore, the observer is likely to move the viewing point to the object S on the opposite side in spite of the presence of the projection screen 130, that is, move the viewing point (focal point) to a position of a depth d from the eye Y of the observer.

Meanwhile, in the state after a video is projected, as shown in FIG. 1(b), with the appearance of the video on the projection screen 130, the observer moves the viewing point to the projected video, that is, to the projection screen 130 or a position of a depth d' from the eye Y.

As described above, in the projection video display apparatus in which an enlarged video is projected and displayed on the transparent or semi-transparent projection screen 130 having transmission characteristics through which background can be seen when no video is displayed, an observer needs to move the viewing point before and after the video is displayed. Also, the studies by the inventors have revealed that there is possibility that the problem in the visibility of an image displayed on the projection screen 130 arises, for example, it becomes difficult to understand the details of the displayed screen. Further, in a projection video display apparatus having a so-called interactive function which makes it possible to perform a predetermined operation on the display screen, the problem that it becomes difficult for an observer who is an operator to understand the position of a button or the like to be operated is pointed out (the position of the button is likely to be confused with the position of the object S behind the projection screen 130 on which the observer has focused until then).

In addition, the same applies to the front projection board apparatus (that is, front projection video display apparatus), and an observer needs to move the viewing point unexpectedly before and after the video is displayed on the transparent or semi-transparent projection screen 130 as shown in FIG. 2(a) and FIG. 2(b).

The present invention has been made based on the result of studies by the inventors described above, and the outline thereof will be described below.

Namely, as can be seen from the result of studies described above, it can be understood that, when a video is projected and displayed on the transparent or semi-transparent projection screen 130 having transmission characteristics through which background can be seen when no video is displayed, it is important to make a viewer visually recognize the position of the projection screen 130 on which the video is displayed preliminarily or simultaneously. Therefore, as an example, as shown in FIG. 3, in a projection video display apparatus or a video display method thereof, a screen to make an observer visually recognize the position is preferably displayed together with a video to be watched during a period of starting to display the video after start-up of the apparatus, in particular, during a predetermined initial period thereof or simultaneously.

More specifically, for example, a video display position recognition screen which is a video to make a video watcher recognize the position where the video is projected is displayed at the time when the power switch of the apparatus is turned on, and thereafter, the video to be displayed is projected and displayed. At this time, the watcher is first made to recognize a marker (video display position recognition screen) (shown in FIG. 5(a)) and then the video to be displayed is projected (shown in FIG. 5(b)).

Note that the video display position recognition screen can be configured by using a color of green having a wavelength with a high luminosity function (555 nm) or a color of yellow or orange also having a wavelength with a high luminosity function (see FIG. 4). For example, as shown in FIG. 5(a), it is conceivable that a screen in which the entirety or part of the display screen of the projection screen 130 (for example, central portion or peripheral portion thereof) is configured of a color having a high luminosity function such as green is used as a video display position recognition screen 500. Also, as the video display position recognition screen 500, as shown in FIG. 5(b), the screen may be simultaneously displayed together instead of alone in a part of the video to be displayed (for example, in a central portion C or peripheral portion P thereof), and further, it is obvious for a person having ordinary skill in the art that the same effect can be obtained by making the position of the projection screen 130 on which the video is displayed visually recognized by flashing or the other methods.

Subsequently, more specific example of the projection video display apparatus based on the principle of the present invention described above and the transparent or semi-transparent screen on which the video is projected from the apparatus will be described below.

Embodiment

FIGS. 6 to 8 are a front view, a side view, and a top view showing the overall structure of a system including the rear projection board apparatus (that is, rear projection video display apparatus) that projects the video from a rear side of the screen together with the transparent or semi-transparent projection screen 130 having transmission characteristics through which background can be seen when no video is displayed. In this example, a landscape-oriented screen having an aspect ratio of a projection (display) surface of, for example, 16:9 is shown as the projection screen 130. The transparent or semi-transparent projection screen 130 having transmission characteristics through which background can be seen when no video is displayed is surrounded by a support frame 111, and a handle 112 protruding in a c-shape or u-shape on a display surface side is attached at a substantially central portion of a support frame reinforcement member 110 below the support frame 111.

The transparent or semi-transparent projection screen 130 having transmission characteristics through which background can be seen when no video is displayed is installed in an upright state, that is, vertically to a floor surface in an indoor space including a classroom, a conference room or the like by a screen holding unit (stand) 113. In more detail, a screen holding unit 114 having a box-like outer shape is attached to an upper part of the screen holding unit (stand) 113, and the projection screen 130 is detachably mounted and fixed to an upper surface of the screen holding unit 114. Also, at a lower end of the screen holding unit (stand) 113, a leg portion 115 having a substantially elliptical outer shape with a portion cut away is formed (see FIG. 8). Further, casters 116 for movement are provided on a bottom of the leg portion, so that a projection board which can be easily moved as the entire apparatus is realized.

Further, on a rear surface side of the screen holding unit 114, a member in which an optical scanning video projection apparatus whose detailed structure will be described later is disposed, that is, a projector installation unit 117 is detachably provided. Note that a reference character 118 denotes a wall portion which is a part of the projector installation unit 117 and forms an installation space of the optical scanning video projection apparatus. With the configuration described above, as can be seen from the figure, the optical scanning video projection apparatus can be disposed at a desired position with respect to the projection screen 130 by only placing it on the projector installation unit 117. Also, a reference character 119 in the figure denotes a transparent window which is attached to a part of the projector installation unit 117 and is provided for transmitting a video light from the optical scanning video projection apparatus to outside (that is, to the projection screen 130), and it may be provided as a mere space or a transparent member such as glass fitted thereto.

FIGS. 9 and 10 are a front view and a side view showing an overall structure of a tabletop small-sized projection video display apparatus which can be mounted on an upper surface of a table or the like and in which video is projected from a front surface side of a screen unlike the embodiment described above, that is, the so-called front projection board apparatus (front projection video display apparatus) according to another embodiment of the present invention. Also in these figures, a reference character 130 denotes a transparent or semi-transparent projection screen having transmission characteristics through which background can be seen when no video is projected. The projection screen 130 is surrounded by a support frame 111, a screen holding unit 114 having a substantially elliptical shape is provided at a substantially central portion of a support frame reinforcement member below the support frame 111, and the projection screen 130 is detachably fixed onto the screen holding unit 114.

In this example, on a front surface side of the screen holding unit 114, a member in which an optical scanning video projection apparatus is disposed, that is, a projector installation unit 117 is disposed. Also, FIG. 10 shows a state in which a light path reflecting mirror 3 protrudes from the projector installation unit 117, and FIG. 11 shows a top view of the video projection apparatus.

<Projection Video Display Apparatus>

Subsequently, FIG. 12 shows an example of the principle of an optical scanning video projection apparatus 10 constituting an optical scanning type video projection apparatus which projects a desired video on the projection screen 130 in the above-described rear or front projection board apparatus (rear or front projection video display apparatus). Namely, in the figure, laser beam can be scanned by reflecting the laser beam from a light source unit 4 by a scanning mirror (optical scanning unit) 1 having a rotation axis. Conceptually, respective modulated pixels 201 are two-dimensionally scanned on an imaging plane along a scanning trajectory 202, so that a desired video is displayed on the projection screen 130.

Note that a reference character 300 in the figure denotes a control unit for controlling the scanning mirror (optical scanning unit) 1 and the light source unit 4, and the control unit 300 includes, for example, a CPU 301 which executes a predetermined operational process and a RAM 302 and a ROM 303 constituting a storage unit as shown in the figure. The control unit 300 controls the operation of the scanning mirror (optical scanning unit) 1 and also controls generation of laser light from the light source unit 4 based on video signals from outside, thereby projecting desired video light.

<Video Display Position Recognition Screen>

In addition, the control unit 300 executes, by the CPU 301, the command stored in advance in the ROM 303 serving as a storage unit or the like, thereby executing the display of the video display position recognition screen described above in FIG. 3. Note that the video display position recognition screen whose example is shown in FIG. 5 can be easily formed by storing it in advance in the ROM 303 serving as a storage unit or the like.

Next, details of the two-dimensional deflection action in the optical scanning unit 1 will be described with reference to FIG. 13. In the optical scanning unit 1 in the figure, a scanning mirror surface 1a which deflects laser light at a reflection angle is connected to first torsion springs 1b coaxially disposed to face each other with the scanning mirror surface 1a interposed therebetween. The first torsion springs 1b are connected to a holding member 1c, and the holding member 1c is further connected to second torsion springs 1d. In addition, though not shown, a permanent magnet and a coil are disposed at a substantially symmetrical position with respect to each of the torsion springs 1b and 1d. These coils are formed in substantially parallel with the mirror surface 1a of the scanning mirror 1, and generate a magnetic field substantially parallel with the mirror surface 1a when the mirror surface 1a of the scanning mirror 1 is in a stationary state. When current flows through the coil, Lorentz force substantially perpendicular to the mirror surface 1a is generated according to Fleming's left-hand rule.

Accordingly, the mirror surface 1a is rotated to the position where the Lorentz force and the restoring force of the torsion springs 1b and 1d are balanced. For the torsion springs 1b, the mirror surface 1a performs a resonant operation by supplying an alternating current to the coil at a resonance frequency of the mirror surface 1a. Similarly, for the torsion springs 1d, the mirror surface 1a, the torsion springs 1b, and the holding member 1c perform a resonant operation by supplying an alternating current to the coil at a combined resonance frequency of the mirror surface 1a and the holding member 1c. In this manner, resonant operation with different resonance frequencies is possible in two directions.

In more detail, when the rotation angle of the scanning mirror 1 serving as a reflection surface of the optical scanning unit is set to β/2 in FIG. 14, the scanning angle which is the angle of the reflected light changes by twice the rotation angle β/2, that is, β. Here, when no optical element is disposed between the scanning mirror 1 and an imaging plane 20, the scanning angle β is equal to an incident angle α on the imaging plane. Therefore, a size of a scanning image with respect to a certain projection distance is determined by the rotation angle β/2 of the scanning mirror 1.

Next, a general resonant action which is the operation of the scanning mirror 1 will be described with reference to FIGS. 15 and 16. When the scanning mirror 1 with the rotation angle of ±β/2 is driven to resonate, that is, in a sinusoidal manner, the orientation of the scanning mirror 1 changes sinusoidally in the range of ±β/2. Specifically, in an example in the case of using the scanning mirror 1 with a rotation angle of ±5.3 degrees shown in FIG. 15, the scanning angle is twice the rotation angle to be ±10.6 degrees, and the incident angle on the imaging plane is also ±10.6 degrees. Also, the scanning coordinates in FIG. 16 are scanning coordinates on the imaging plane in the case where the space for the arrangement of the optical element is secured, and have sinusoidal characteristics similar to those in FIG. 15.

Note that, for the driving system of the scanning mirror 1, there is also a galvano mirror having a sawtooth wave rotation angle change in addition to a resonant mirror having a sinusoidal rotation angle change, but the resonant mirror with a large driving frequency is suitable for high resolution display.

Also, in the description above, the optical scanning video projection apparatus 10 which projects video on the projection screen 130 having transmission characteristics through which background can be seen when no video is projected is disposed in the projector installation unit 117 provided below the projection screen 130, more specifically, provided so as to be adjacent to a part of the periphery on the rear surface side thereof, that is, at a substantially central portion along the lower side of the screen. However, it is obvious for a person having ordinary skill in the art that the optical scanning video projection apparatus 10 is not limited to the example described above and may be installed along an upper side or a lateral side of the screen instead of the example described above. Further, though described later, the optical scanning video projection apparatus 10 provided so as to be adjacent to a part of the periphery of the screen is not limited to that installed alone, but a plurality of the optical scanning video projection apparatuses 10 may be installed together.

<Transparent or Semi-Transparent Screen Having Transmission Characteristics Through which Background can be Seen when No Video is Projected>

Subsequently, FIGS. 17 and 18 each show a specific configuration of the transparent or semi-transparent screen 130 having transmission characteristics through which background can be seen when no video is projected in the rear projection board apparatus (rear projection video display apparatus) described above. The projection screen 130 is configured of, for example, a polycarbonate plate, a sheet-shaped resin material such as PET sheet, or a glass plate. As can be seen from the figure, on a rear surface side thereof (that is, light source side opposite to an observer side), a plurality of light path changing means 61 having a continuous triangular (sawtooth wave) cross section and a function of deflecting and changing the light (laser light) forming the above-described scanning screen into light directed to the observer side (that is, viewer side) are formed. Namely, the direction of the light is changed to the direction substantially perpendicular to the scanning screen by the light path changing means 61, and the light is then emitted to a viewing side of the scanning screen. As a specific example of the light path changing means 61, it may be formed as the (eccentric) circular Fresnel lens shown in FIG. 17 or as the linear Fresnel lens shown in FIG. 18.

Figure 19:
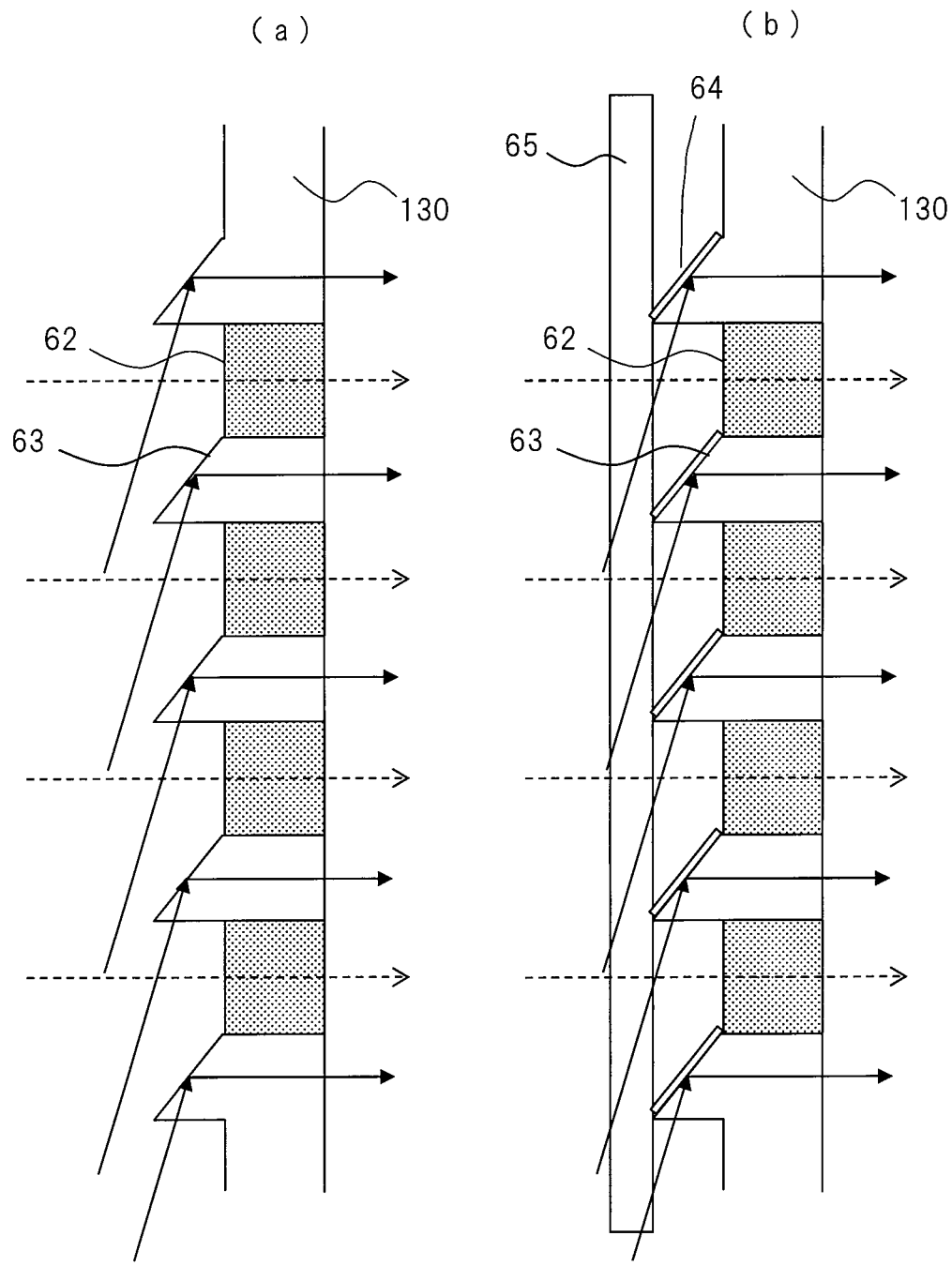

Furthermore, as shown in FIG. 19(*a*), a flat portion 62 having a predetermined length may be formed between these light path changing means 61 (semi-transparent type). Note that these light path changing means 61 are formed with a pitch (interval) of about 30 to 100 μm in this example. In addition, as shown also in FIG. 19 (*b*), a transparent protection plate 65 may be provided on the rear surface (that is, surface on which the light path changing means 61 are formed) of the projection screen 130.

Next, FIGS. 20 and 21 each show a specific configuration of the projection screen 130 in the front projection board apparatus (front projection video display apparatus) described above. On a rear surface of the projection screen 130 (that is, on a side opposite to an observer side), a plurality of light path changing means 61 having a continuous triangular (sawtooth wave) cross section and a function of deflecting and changing the light (laser light) incident from a front surface (viewing side) and forming the above-described scanning screen into light directed to the observer side (that is, viewer side) are formed. Namely, the direction of the light is changed to the direction substantially perpendicular to the scanning screen by the light path changing means 61, and the light is then emitted to a viewing side of the scanning screen. As a specific example of the light path changing means 61, it may be formed as the (eccentric) circular Fresnel lens shown in FIG. 20 or as the linear Fresnel lens shown in FIG. 21.

Furthermore, as shown in FIG. 22, a flat portion 62 having a predetermined length may be formed between these light path changing means 61 (semi-transparent type). Note that the refractive index and the Fresnel angle of the material of these light path changing means 61 may be optimized so that the video light is totally reflected, and a reflection film 64 which is formed of a metal film or a multilayer metal film which increases a reflectance to a specific polarized wave may be provided as shown in FIG. 19(*b*) described above. In this example, the light path changing means 61 are formed with a pitch (interval) of about 30 to 100 μm. In addition, the transparent protection plate 65 is provided on the rear surface (that is, surface on which the light path changing means 61 are formed) of the projection screen 130.

As described above, for example, a metal film made of aluminum or a multilayer metal film made of Ti, Nb, and Si is formed on an inclined surface 63 which forms these light path changing means 61, so that the reflection surface of the light (laser light) is formed. Note that, when the oblique projection optical system as in this embodiment is used, in particular, the eccentric Fresnel lens in which the Fresnel center is deviated from the scanning screen may be preferable. On the other hand, as to the linear Fresnel lens, for example, it can be manufactured relatively easily by the rolling process and the like and is suitable for mass production, and it is thus possible to manufacture a large screen at low cost.

Also, with the transparent protection plate 65 provided on the surface of the projection screen 130 on which the light path changing means 61 are formed, it is possible to protect the projection screen 130 from the mechanical impact applied from the rear side. In addition, by shielding the light path changing means 61 from the outside air, dust and the like in the air are less likely to be deposited, and the projection screen 130 can be maintained in a good state over a long period of time.

With the projection screen 130 described above, if a total reflection method is adopted in order to reduce the reflection loss on the incident surface, it is possible to realize an apparatus capable of obtaining an excellent scanning image with low reflection loss, in other words, an ultra-low power consumption apparatus with high light use efficiency.

Also, on the other hand, with the projection screen 130 made of the semi-transparent sheet shown in FIGS. 17 to 22, if seen from an observer side, the projection screen 130 is transparent or semi-transparent when no video is projected. Therefore, it will be possible to obtain the advantage that various improvements can be made to the design of the overall rear projection video display apparatus including a sense of presence in the room where the apparatus is disposed.

Further, in the projection screen 130 described above, a desired transparency (degree of semi-transparency) can be obtained by setting the thickness of the metal film made of aluminum or the like formed on the inclined surface 63 of the light path changing means 61 as appropriate. As an example, the projection screen 130 having the transparency of 50% and the reflectance of 50% can be obtained by setting the thickness of the metal film made of aluminum to about 70 to 80 nm.

In addition, the laser light emitted from the optical scanning video projection apparatus and reflected by the light path changing means 61 of the projection screen 130 in a predetermined direction is preferably s-polarized light in consideration of the reflection characteristics thereof. Therefore, a filter or the like for converting p-polarized light into s-polarized light may be provided in an output unit of the optical scanning video projection apparatus.

As can be seen from the foregoing, with the rear or front projection board apparatus (rear/front projection video display apparatus) according to the present invention described above, the video can be displayed on the above-described transparent or semi-transparent projection screen 130 by scanning with the use of the coherent light from the light source unit by the scanning mirror (optical scanning unit), that is, the reflection of the laser light. Accordingly, the highly portable and low power consumption rear projection video display apparatus improved in size and weight reduction and good designability is provided.

In addition, it is also possible to adopt the screen made of transparent or semi-transparent sheet having a structure described in the conventional technology in addition to the projection screen 130 described above. Further, it is also possible to use a structure such as a transparent or semi-transparent wall (partition) or window constituting a building as a screen.

As described above, when video is projected and displayed on the projection screen 130, the so-called video display position recognition screen 500 (see FIG. 5 above) for making an observer visually recognize the position of the projection screen 130 on which the video is displayed is displayed preliminarily or simultaneously. In this manner, for example, even when the video is displayed by using the transparent or semi-transparent window or wall (partition) as a screen, the video can be projected and displayed without giving sense of discomfort to an observer.

Other Embodiments

In the description above, the rear projection video display apparatus is configured to form the video by scanning the laser light, which is coherent light from the light source unit, by the scanning mirror (optical scanning unit). However, the present invention is not limited to that, and it goes without saying that it is also possible to adopt a general video projection apparatus 400 in which light from a light source P0 is modulated into video light by a liquid crystal display element (liquid crystal panel) P1 and then the light is projected to display the video on the transparent or semi-transparent projection screen 130 through an optical system including lenses L1 to L14, a mirror 103 and others as shown in FIGS. 23 and 24.

Note that, even at that time, when the video is projected and displayed on the screen, the so-called video display position recognition screen 500 (see FIG. 5 above) for making an observer visually recognize the screen position on which the video is displayed is displayed preliminarily or simultaneously. In this manner, the video can be projected and displayed without giving sense of discomfort to the observer.

In the foregoing, various embodiments have been described in detail. However, the present invention is not limited to the foregoing embodiments and includes various modifications. For example, the embodiments above have described the overall system in detail for easy description of the present invention, and the present invention is not always limited to those including all of the described configurations. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

REFERENCE SIGNS LIST

130: projection screen (transparent or semi-transparent screen), 10: optical scanning video projection apparatus, 1: optical scanning unit, 1a: scanning mirror, 400: projection video projection apparatus, 500: video display position recognition screen

The invention claimed is:

1. A projection video display apparatus for projecting and displaying video light on a rear surface or front surface of a transparent or semi-transparent video projection screen, the projection video display apparatus comprising:
   a light source which generates the video light to be projected and displayed; and
   an optical system which projects the generated video light to the rear surface or front surface of the transparent or semi-transparent video projection screen,
   wherein the optical system projects a screen position recognition information for enabling a user to recognize a position of the transparent or semi-transparent video projection screen where the generated video light is projected, and
   wherein the screen position recognition information is projected and displayed before the generated video light is projected on the transparent or semi-transparent video projection screen or the screen position recognition information is projected and displayed during an initial period of a period when the generated video light is displayed on the transparent or semi-transparent video projection screen.

2. The projection video display apparatus according to claim 1,
   wherein the screen position recognition information includes a portion which can be easily visually recognized in all or a part of a display screen projected and displayed on the rear surface or front surface of the transparent or semi-transparent video projection screen.

3. The projection video display apparatus according to claim 2,
   wherein the portion of the screen position recognition information is displayed with colored light having a wavelength with a high luminosity function.

4. The projection video display apparatus according to claim 3,
   wherein the portion of the screen position recognition information is displayed with green colored light.

5. The projection video display apparatus according to claim 3,
   wherein the portion of the screen position recognition information is displayed with yellow colored light.

6. The projection video display apparatus according to claim 3,
   wherein the portion of the screen position recognition information is displayed with orange colored light.

7. The projection video display apparatus according to claim 2,
   wherein the portion of the screen position recognition information is displayed with a flashing light.

8. A video display method for projecting and displaying video light on a rear surface or front surface of a transparent or semi-transparent video projection screen by a projection video display apparatus including a light source which generates video light to be projected and displayed and an optical system to project the generated video light on the rear surface or front surface of the transparent or semi-transparent video projection screen, the method comprising the steps of:
   generating the video light; and
   projecting a screen position recognition information for enabling a user to recognize a position of the transparent or semi-transparent video projection screen to be projected with the video light on the transparent or semi-transparent video projection screen before start of the projection of the generated video light or simultaneously with the start of the projection of the generated video light.

9. The video display method according to claim 8,
   wherein the screen position recognition information is displayed on all or a part of a display screen of the transparent or semi-transparent video projection screen by an easily visually recognizable method.

10. The video display method according to claim 9,
    wherein the screen position recognition information is displayed with colored light having a wavelength with a high luminosity function.

11. The video display method according to claim 10,
    wherein the screen position recognition information is displayed with one or a plurality of colored lights selected from green colored light, yellow colored light, and orange colored light.

12. The projection video display apparatus according to claim 1, wherein the optical system is a scanning mirror.

13. The projection video display apparatus according to claim 1, wherein the light source generates a laser beam.

14. The projection video display apparatus according to claim 12, wherein the light source generates a laser beam.

15. The video display method according to claim 8, wherein the optical system is a scanning mirror.

16. The video display method according to claim 8, wherein the light source generates a laser beam.

17. The video display method according to claim 15, wherein the light source generates a laser beam.

* * * * *